(12) United States Patent
Jäkel

(10) Patent No.: US 6,609,218 B2
(45) Date of Patent: Aug. 19, 2003

(54) METHOD AND DEVICE FOR ANALYZING DATA

(75) Inventor: Torsten Jäkel, Berlin (DE)

(73) Assignee: Tektronix International Sales GmbH, Schaffhausen (CH)

(*) Notice: Subject to any disclaimer, the term of this patent is extended or adjusted under 35 U.S.C. 154(b) by 325 days.

(21) Appl. No.: 09/795,412

(22) Filed: Feb. 27, 2001

(65) Prior Publication Data

US 2001/0025353 A1 Sep. 27, 2001

(30) Foreign Application Priority Data

Mar. 27, 2000 (EP) .......................................... 00106565

(51) Int. Cl.$^7$ ............................................... G06F 11/30
(52) U.S. Cl. ......................................... 714/39; 712/300
(58) Field of Search ............................... 714/39–50, 37; 712/300; 715/513, 516; 707/7, 101

(56) References Cited

U.S. PATENT DOCUMENTS

| 5,347,524 A | * | 9/1994 | I'Anson et al. ................ 714/39 |
| 6,000,041 A | | 12/1999 | Baker et al. |
| 6,209,087 B1 | * | 3/2001 | Cashman et al. ............ 712/300 |

FOREIGN PATENT DOCUMENTS

| EP | 0800299 A2 | 10/1997 |
| WO | WO 00/10304 | 2/2000 |

* cited by examiner

*Primary Examiner*—Scott Baderman
(74) *Attorney, Agent, or Firm*—Francis I. Gray

(57) ABSTRACT

A method and device for analyzing data reads unstructured data into a data memory and compares it with a structure description contained in a structure description memory to identify components of the unstructured data. An addressing logic is initiated in accordance with the identified components of the unstructured data. A register is coupled to the addressing logic to serve as an interface for access to the unstructured data based on the identified components.

13 Claims, 3 Drawing Sheets

METHOD AND DEVICE FOR ANALYZING DATA

BACKGROUND OF THE INVENTION

The present invention relates to a method and device for analyzing data in a protocol analyzer.

In many areas of information processing there are data structures to be analyzed. Such analysis is done on the basis of specified descriptions with the aim being to recognize the data structure, to allow processing of the individual elements separately as components of a message, and to use the values of the elements in further steps. Such data structures may be any bit sequences generated by different sources. Particularly in telecommunications there are high data transfer rates of such bit sequences in the form of protocol messages, with the relevant protocol describing the structure of the data. This involves breaking up the data into units known as protocol data units (PDUs).

FIG. 1 shows a procedure for analyzing the data in accordance with the current state of the art. In Step 1 data are stored in an unstructured fashion, i.e., without any order in the sequence of their transfer, in a memory unit such as a random access memory (RAM). Software is used to compare the unstructured data with a structure description, such as a protocol description. Depending upon the result of the comparison, forms of togetherness and meanings are allocated to the individual data. For example the data in field 14 of Step 2 may define the meaning "name" for the data in field 16, the data in field 18 may allocate the meaning "address" to the data in field 20, while the data in field 22 may allocate the meaning "telephone number" to the data in field 24. In line with the progress of the comparison the disordered data structure is processed sequentially by the software and the protocol structure is built up step by step as shown in Step 3. In this structure the data are now arranged in an orderly fashion as desired, with field 26 showing the data following in field 28 to be a name, field 30 showing the data following in field 32 to be an address, and field 34 showing the data following in field 36 to be a telephone number. By means of a register it is possible, as indicated by arrows, to obtain access to the data arranged in an orderly fashion. Since the data are arranged in an orderly fashion, the register may always access the same positions when a certain type of information is requested from a terminal.

The disadvantage of this procedure, as is well known in the art, is the extensive time and computation effort required for this type of data preparation.

What is desired is a method and device for analyzing data that is simpler and less time consuming than those procedures described above in order to gain quicker access to the data.

BRIEF SUMMARY OF THE INVENTION

Accordingly the present invention provides a method and device for analyzing data in which the unstructured data is read into a memory, the unstructured data is then compared with a structure description to identify components of the unstructured data, and an addressing logic is initialized in accordance with the identified components of the unstructured data. A register is coupled to the addressing logic to serve as an interface for access to the unstructured data based on the identified components.

The objects, advantages and other novel features of the present invention are apparent from the following detailed description when read in conjunction with the appended claims and attached drawing.

DETAILED DESCRIPTION OF THE INVENTION

Figure 1:
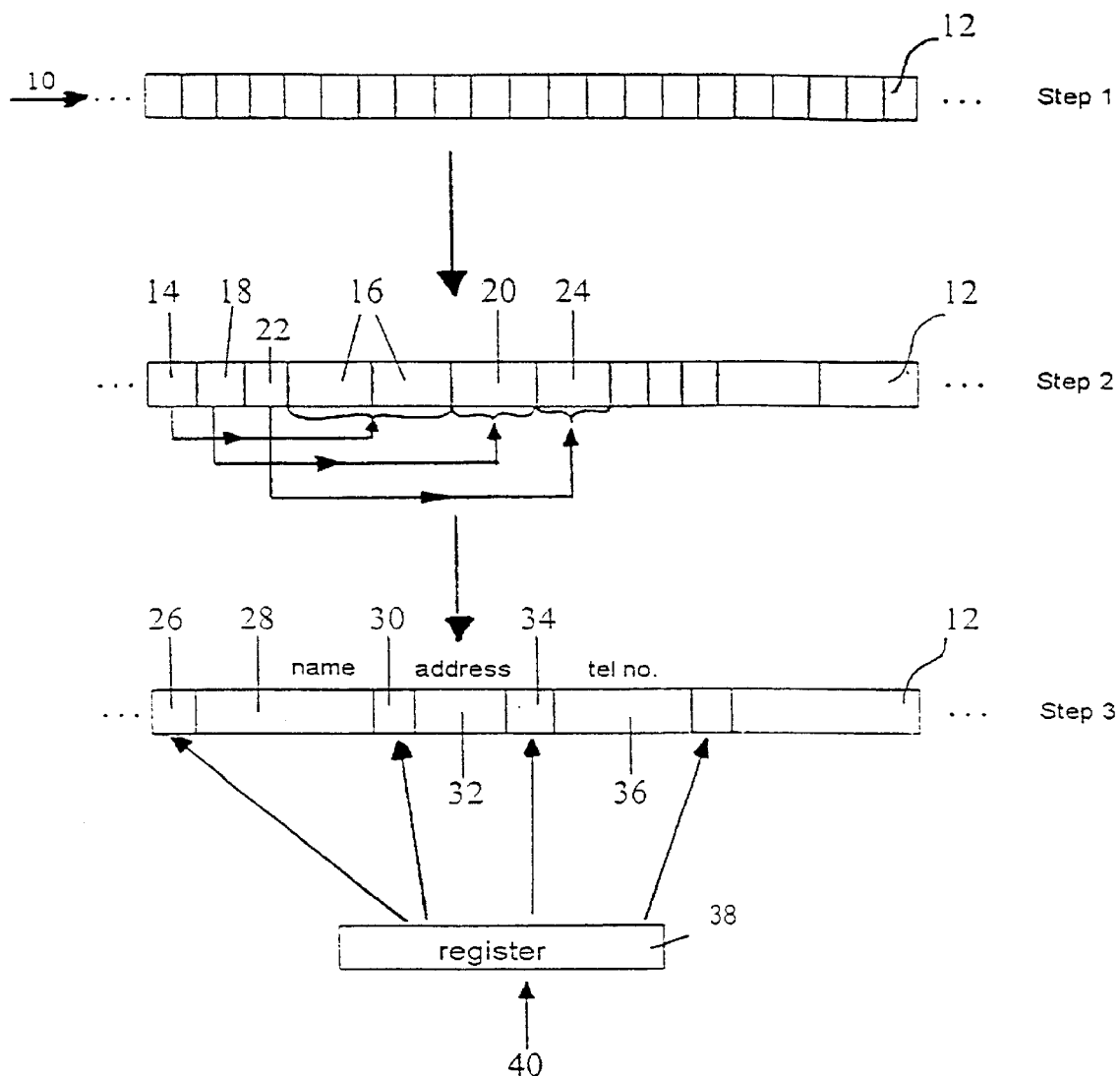
FIG. 1 is a schematic representation showing a prior art procedure for analyzing data.
Figure 2:
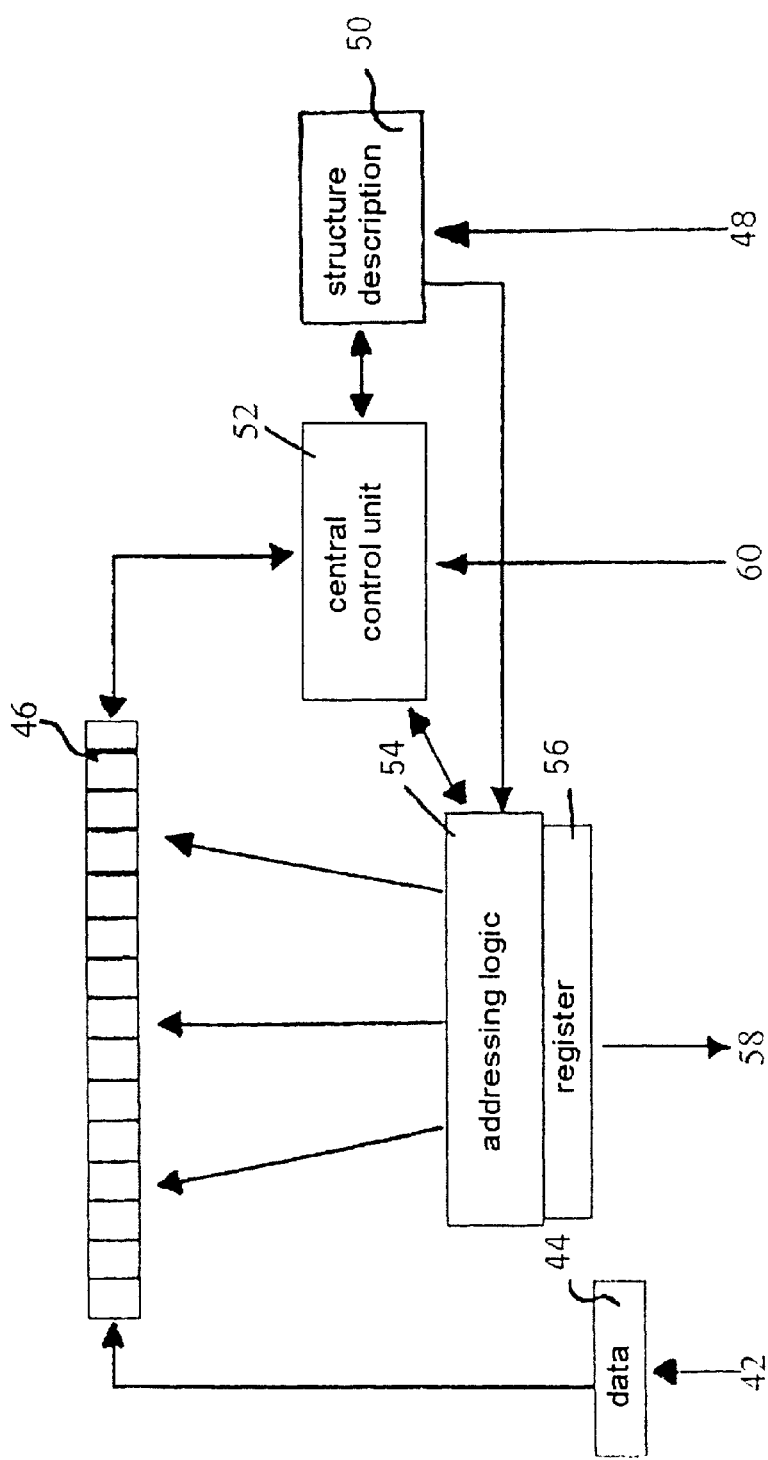
FIG. 2 is a schematic block diagram view showing a first embodiment of a method and device for analyzing data according to the present invention.

Referring now to FIG. 2 a first embodiment of a method and device for analyzing data is shown where data is transferred via an input 42 in an unstructured form to a data interface 44. Via the data interface 44 the data are sequentially read into a data memory 46, also in unstructured form, the data memory preferably being a bit-oriented random access memory (RAM). The RAM corresponds to a large linear bit field similar to a shift register.

A structure description memory 50 contains information, loaded via a protocol input 48, on a possible data structure of the data for the bit stream received, i.e., a protocol description. The information is descriptive in order to view elements of the bit stream as basic units, i.e., bits, bytes, words, arrays, etc. The structure description information also contains decision points, such as dependencies, that determine which variants of a partial description are to be used as a function of the existence or the value of certain data components. The decision points include branch or repetition points.

A central control unit 52 with a comparator conducts a comparison of the elements of the structure stored in the structure description memory 50 with the unstructured data in the data memory 46, and initializes an addressing logic 54 corresponding to the identified components of the data in the data memory. Via a register 56 the identified protocol components may be read out with the correct type, the correct size and with other additional information via an output 58. Reading out via the register 56 is effected by simple operations, known as word-reading operations. These operations involve an automatic adaptation of the size (number of bits), the bit sequence and the alignment. For this access to the identified components addressing may be in the form of linear addressing, i.e., the data are located directly inside the address room of a processor. Alternatively queues may be formed so that the elements may be read out step by step at a register. Because of the high speed and direct access, the first variant is preferred. However it requires a large storage area because every element or bit is shown as an integer register.

Via an input 60 commands may be sent to the central control unit 52 to load another structure description into the structure description memory 50, to load a new data set into the data memory 46, to make available certain identified data components through the register 56, etc. Depending upon the structure description loaded during the analysis of the next data set a part of the old data set is retained in the data memory 46 to ensure that the data components that have more than one bit, i.e., those beginning in a first data set and ending in a following second data set, may also be identified.

Figure 3:
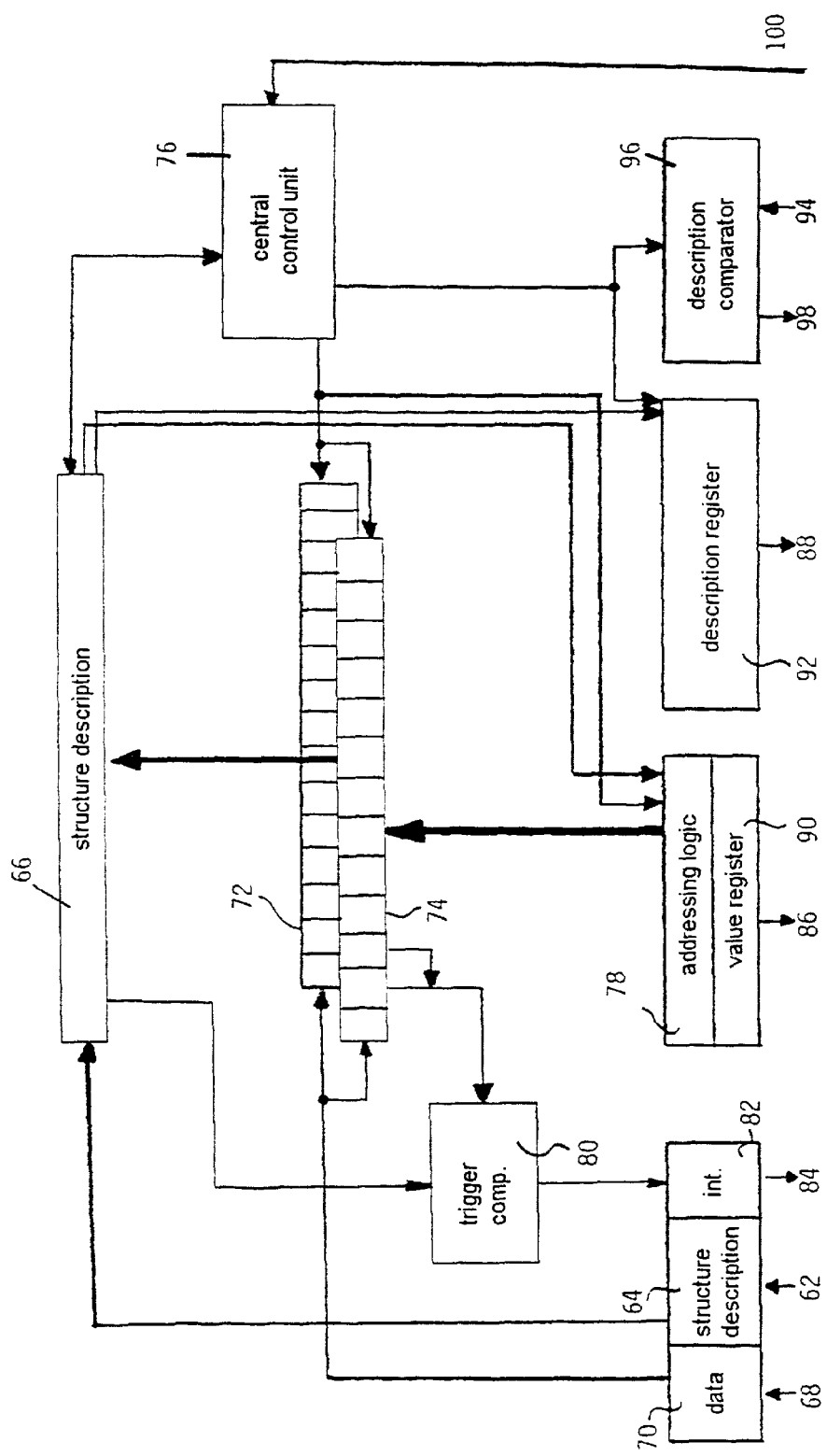
FIG. 3 is a schematic block diagram view showing a second embodiment of a method and device for analyzing data according to the present invention.

FIG. 3 shows another embodiment of the method and device where via an input 62 of an associated interface 64 structure descriptions may be loaded into a structure description memory 66. Data are transferred sequentially in an unstructured form via an input 68 of an interface 70 to a first or second data memory 72, 74. The use of two data memories 72, 74 allows identification or decoding of components of the data of one of the two data memories in the background, while in the foreground the already identified components of the other data memory may be accessed. The structure description memory 66 may be designed such that several different structure descriptions may be stored in it which may be applied serially to the data stored in the data memories 72, 74. There may be several memories, rather than just two, with the structure description desired in each case being compared with the data in the relevant memory via a central control unit 76. Another alternative has only one structure description memory into which different structure descriptions may be loaded as desired, with the structure description memory being loaded while the data memory to which the new structure description applies also is being loaded.

The structure description may be a protocol description which, apart from keywords to describe the structure and the interdependencies of the received data by description identification tags known as description IDs, contains unique element IDs. This allows each basic element, such as a bit, byte, word or array, of the bit stream to be referenced. For data components of variable lengths the position of the subsequent elements in the register is no longer known, so allocation has to be via the description IDs.

In an addressing logic 78 the access information is stored in accordance with the identified data of the data memories 72, 74. The data may be loaded only into one data memory and analyzed there. Following analysis and appropriate initializing of the addressing logic 78, the data are shifted from one data memory 72 to the other data memory 74 from whence they are read out using the addressing logic.

A trigger comparator 80 is coupled to the structure description memory 66 and the data memories 72, 74. The signals upon which triggering occurs may be loaded and activated together with the structure description. If a trigger bit is set in the structure description, i.e., for a trigger to be initiated when a certain data component such as a certain description ID or element ID appears in the data being analyzed, and if the trigger element actually is detected by the trigger comparator 80, an interrupt is initiated via an interface 82 to an output 84. The output 84 may be used to indicate the end of an analysis.

To enable triggering in response to several data components, several memories 72, 74 are provided for the data components to be specified. Different combinations of element IDs and description IDs may be achieved by logical linking operations such as AND, OR or NOT. The link may also be made by means of processing software if each trigger event is reported and delivered separately.

With this embodiment the data components identified are made available separately by value, by the element ID and by the description ID, at outputs 86, 88 with a value register 90 providing the value of the data component while a description register 92 supplied the associated description. If triggering occurs in response to a certain description ID, the corresponding element ID may be read out via the value register 90.

Via an input 94 a description ID may be delivered to a description comparator 96 to determine whether a corresponding component has appeared in the data to be analyzed. The relevant information is returned at an output 98. The input 100 corresponds to the command input 60 of FIG. 2. Also the comparator in the central control unit 76, the description comparator 96 and the trigger comparator 80 may be implemented as hardware rather than software to ensure especially swift processing.

The above embodiments are based on the realization that after identification of components within the unstructured data, an addressing logic that is upstream of the data memory and initialized in accordance with the components identified allows access to the components without the data components having to be prepared, i.e., resorted, in advance. The addressing logic puts pointers on the unstructured data which allow reading out and further processing of the desired data components by storing them in another storage medium.

Thus the present invention provides a method and device for analyzing data that decodes unstructured data and uses addressing logic to directly access the unstructured data for processing without requiring resorting into structured data.

What is claimed is:

1. A method of analyzing data comprising the steps of:
   reading unstructured data into a data memory;
   comparing the unstructured data with a structure description to identify components of the unstructured data; and
   initializing an addressing logic in accordance with the identified components of the unstructured data to directly access the unstructured data for analyzing.

2. The method as recited in claim 1 further comprising the step of loading the structure description into a structure description memory.

3. The method as recited in claim 2 further comprising the step of loading a further structure description into the structure description memory and repeating the comparing and initializing steps for each structure description.

4. A device for analyzing data comprising:
   a data memory into which unstructured data is stored;
   a structure description memory into which a structure description is stored;
   an addressing logic for accessing individual components of the unstructured data in the data memory;
   a comparator for comparing the structure description from the structure description memory with the unstructured data in the data memory to identify the individual components for the addressing logic; and
   a register coupled to the addressing logic for outputting data from the unstructured data in the data memory accessed by the addressing logic.

5. The device as recited in claim 4 wherein the structure description memory comprises a plurality of structure description memories, each structure description memory containing a difference structure description.

6. The device as recited in claim 4 wherein the data memory comprises at least two data memories so that one data memory may be loaded with a new set of unstructured data while the other data memory concurrently contains a previous set of unstructured data that is being analyzed.

7. The device as recited in claim 4 wherein the data memory comprises a linear bit field random access memory.

8. The device as recited in claim 4 wherein the register comprises:
   a value register at which a value of one of the identified components is made available; and a description register at which a description of the one of the identified components is made available.

9. The device as recited in claim 4 further comprising a trigger comparator for initiating a trigger signal when at least one particular component of the identified components and/or at least one particular value of the one particular component appears.

10. The device as recited in claim 9 further comprising a trigger register coupled to the trigger comparator for storing the trigger signal.

11. The device as recited in claim 8 further comprising a structure description comparator coupled to the description register having a description of a component from the structure description such that the structure description comparator allows a comparison of the description with descriptions in the description register resulting in initiation of the value register with a value corresponding with the description if the comparison is positive.

12. The device as recited in claim 4 wherein the address logic is initialized so that it allows a uniform access to the data in the data memory.

13. The device as recited in claim 12 wherein the addressing logic logically aligns the accessed data and converts it into a predefined, particularly uniform format.

* * * * *